United States Patent [19]

Warner

[11] Patent Number: 4,551,165
[45] Date of Patent: Nov. 5, 1985

[54] MYCORRHIZAL SEED PELLETS

[75] Inventor: Anne Warner, Harpenden, England

[73] Assignee: National Research Development Corporation, England

[21] Appl. No.: 486,192

[22] Filed: Apr. 18, 1983

[30] Foreign Application Priority Data

Apr. 22, 1982 [GB] United Kingdom ................. 8211678
Jul. 26, 1982 [GB] United Kingdom ................. 8221584

[51] Int. Cl.$^4$ ............................................. C05F 11/02
[52] U.S. Cl. ............................................. 71/24; 71/5;
71/6; 47/1.1; 47/57.6; 47/DIG. 9
[58] Field of Search ........................ 71/5, 24; 435/254;
47/1.1, 57.6, DIG. 9

[56] References Cited

U.S. PATENT DOCUMENTS 1,988,307  1/1935  Fay ........................................ 47/1.1
4,294,037  10/1981 Mosse et al. ......................... 435/254

OTHER PUBLICATIONS

"Soil Pellets to Introduce VAM Fungi into Soil", Hall, Jrnl. Biol. & Biochem., vol. II, pp. 85–86, 1979.
Powell, "Efficient Mycorrhizal . . . Requirements", pp. 24–26, Ruakara Farmers Conference.
Powell, "Inoculation of . . . Fungi", pp. 81–85, 1979, The New Phytologist.
Haymen et al., "Methods for . . . Fungi", pp. 247–253, 1981, Ann. Appl. Biol.
Hall et al., "An Improved . . . Pellets", pp. 221–222, 1981, Jour. Agric. Research.
Brockwell, "A Treatise . . . Fixation", pp. 277–309, 1977, Agronomy & Ecology, ed. Hardy & Gibson; John Wiley & Sons–publ.

Primary Examiner—Ferris H. Lander
Attorney, Agent, or Firm—Jacobs & Jacobs

[57] ABSTRACT

It has been a problem to pellet seeds with inoculum of the beneficial VA mycorrhizal fungus. Hitherto, clay or soil pellets have been tried but they are difficult to adjust to a suitable moisture content and the pellets are too heavy, and there is a problem in placement of the seed so as to ensure that the radicle will grow through the pellet and thereby pick up the desired fungal infection. It has now been found that satisfactory pellets can be made using a mixture of peat, preferably sphagnum moss peat (instead of soil), together with a binder, seed and the VA mycorrhizal fungus, and that even when the pellet is dried considerably the inoculum retains infectivity for at least 6 months, using sphagnum moss peat. The composition in compacted, sowing unit, e.g. pellet, form and a method of growing plant from seed are claimed. The invention is useful for improving the condition of poor soil, e.g. filled-in gravel pits or coal mine spoil tips.

10 Claims, No Drawings

MYCORRHIZAL SEED PELLETS

This invention is in the field of soil microbiology and relates to the improvement of plant growth in poor soils. More particularly, it relates to the introduction of a crop into a poor soil by sowing seeds of the desired plants in the form of pellets which contain mycorrhizal inoculum.

The mycorrhizal fungi with which this invention is concerned are of the VA (vesicular-arbuscular) type. These beneficial fungi infect the feeding roots of plants and stimulate uptake of phosphorous from the soil. Hyphae of the fungus grow outwardly from the root well beyond the phosphate depletion zone, (the zone from which the available phosphate has already been consumed by the plant). Generally stated, the fungus can only grow in association with live host roots. Thus, infected air-dried roots lose their infectivity quite quickly. Very recently, tentative suggestions have been made that limited growth of the fungus on plants which are not ordinarily hosts or in soil semi-sterilised by irradiation can occur, see J A Ocampo and D S Hayman, New Phytologist 87 333–343 (1981) and A Warner and B Mosse, Transactions of the British Mycological Society 74, 407–410 (1980).

New Zealand workers have been interested in improving pasture growth on hills. It has been proposed to pellet seeds with VA mycorrhizal inoculum, for distribution by air. C Ll Powell, Proceedings of the Ruakura Farmers Conference 1977, describes making a large pellet of soil, VA mycorrhizal inoculum and soil by mixing the ingredients wet and coating the pellet with bentonite clay. The clay coating is washed off by heavy rain. One disadvantage of these pellets is that they have to be made large, e.g. 1.5 cm. in diameter, in order to contain enough inoculum. In a subsequent paper, Dr. Powell reports improved growth of clover and ryegrass in unsterilised soil sown with seeds pelleted in VA mycorrhizally inoculated soil as pellets 1 cm. in diameter, see New Phytologist 83, 81–85 (1979). However, there is a problem referred to by I R Hall, Soil Biology and Biochemistry 11, 85–86 (1979), namely that if the pellets are made too moist, germination of the seed will be hindered. If, on the other hand, the pellets are too dry, the soil particles will not be bound together compactly. The production of soil pellets is also time-consuming, a problem which led I R Hall and A Kelson, Journal of Agricultural Research 24, 221–222 (1981), to try a different technique. The VA mycorrhizal inoculum, silt clay and sand mixture was formed into pellets measuring $12 \times 12 \times 6$ mm., and seeds were glued onto one face of the pellet. One drawback to this method is the difficulty in ensuring that the clay binding agent is evenly distributed throughout the pellet. Another drawback is the need to arrange that the pellet is placed with the seed coating on top of the pellet so that the radicle will grow through the VA mycorrhizal inoculum: in practice, this would mean coating both faces of the pellet with seed, which would be wasteful. A similar construction of pellet was used by D S Hayman, E J Morris and R J Page, Annals of Applied Biology 89, 247–53 (1981). These workers compared different ways of introducing the inoculum and seed to the soil and found that multi-seeded pellets imparted only slightly less infection to red clover than was obtained in the much more labour-intensive method of placing the inoculum with seed in furrows.

The present invention is based on the finding that VA mycorrhizal inoculum can be mixed with peat, especially sphagnum moss peat, and that this mixture can be formulated with seed and a binder into a most satisfactory pellet. The peat has been found to have a valuable combination on properties which make it especially useful for this purpose. Firstly, it has been found that sphagnum moss peat-inoculum mixtures impart a high degree of fungal infection to the seedling. Secondly, these inoculum mixtures can be stored for long periods while still retaining a substantial proportion of original infectivity. Thirdly, although crumbly, peat can be made more coherent by use of an inexpensive binder without interfering with the other properties of the pellet. Fourthly, it does not need to be moistened excessively in order to make the pellets. Fifthly, the inoculum can be introduced into the peat in a concentrated form, by simple means, so that the size of the pellets can be kept small.

The present invention includes a composition comprising VA mycorrhizal inoculum, peat, preferably sphagnum moss peat, at least one seed and a binder. It includes particularly all compacted forms of this composition divided into units suitable for sowing, especially pellets. Another aspect of the invention includes a method of growing a plant from seed, which comprises sowing units of compacted composition of the invention, and allowing the plants to grow under conditions in which the plants benefit from VA mycorrihizal infection of their root system.

Preferably the peat and inoculum components are prepared in a pre-mixed or pre-combined form, conveniently termed "peat-inoculum", by harvesting blocks of roots of a plant grown in peat and infected with the fungus and finely dividing these blocks. Typically, peat-lettuce root inoculum is produced in this way. The nutrient film technique of culture described in British Patent Specification No. 2043688 (National Research Development Corporation) can be used for this purpose. In a convenient form of this technique, a small quantity of inoculum is mixed with peat and compressed into a block. A lettuce seedling is then placed upon each block and the blocks in concrete channels, through which a nutrient solution is flowed. As the lettuces grow, their roots become infected with the inoculum of the VA mycorrhizal fungus and as the roots grow, the amount of fungus in each block increases. In this way, a small amount of inoculum generates a large amount of fungus in the roots and plant. The fungus is then conveniently harvested by crumbling the entire block, i.e. the mixture of peat and roots. This is proposed in the aforesaid specification merely as a matter of convenience, to facilitate the preparation of an inoculum without having to shake the plants roots free of peat. The advantage of peat as a medium for use in seed pellets was not then appreciated.

Further research, which forms parts of the basis from which the present invention was developed, has shown that the sphagnum moss peat-infected root mixture retains a surprisingly high level of infectivity after storage for six months. It appears that sedge peat is not so well infected and the infectivity is less well retained on storage. It is believed that the long term viability of the fungus in sphagnous peat arises from an ability of the mycelium to penetrate the leaves of the sphagnum, an effect which has not previously been reported in the literature. Inoculum of the VA mycorrhiza *Glomus mosseae* in a mixture with peat, obtained by harvesting the peat blocks containing infected lettuce roots, was subjected to a storage test as follows. The peat blocks were harvested wet and stored (a) in polythene bags in a cold room (5° C.) and (b) air-dried at room temperature. For comparison, inoculum consisting entirely of bare lettuce roots, which had been grown under the same conditions, but in the absence of the peat block was stored in the same way. The peat used was medium cut sphagnum moss peat from the Irish Peat Development Authority. The harvested blocks and roots were reduced to a particle size of less than 5 mm.

The infectivity of the inoculum was tested immediately after harvest and after 30, 60, 90 and 180 days storage under the above conditions. The infectivity was tested as follows. Two grams of fresh samples of inoculum (two grams of the wet material or 0.5 grams of the air-dried) were placed in 7.5 cm. pots filled with a mixture of Ashridge soil (sterilised by irradiation at a dose of 1 megarad) with an equal volume of steam-sterilised sand. The inoculum was placed 2 cm. below the soil surface and a single lettuce seed sown above it. The four replicate pots were harvested 60 days after germination. Infectivity was recorded as a percentage infection in lettuce roots, determined by the gridline intersect method of Giovanetti and Mosse, New Phytologist 84, 489–500 (1980).

The results are shown in Table 1 below:

TABLE 1

Inoculum storage test results

| Type of Inoculum | How stored | % Infection measured in lettuce roots (mean of 4 replicates) Days stored | | | | |
|---|---|---|---|---|---|---|
| | | 0 | 30 | 60 | 90 | 180 |
| Peat + roots | wet | 51.9 | 53.9 | 47.9 | 47.5 | 33.9 |
| Peat + roots | air-dried | 43.8 | 39.9 | 36.1 | 35.5 | 28.5 |
| Bare roots | wet | 29.9 | 25.6 | 21.3 | 20.9 | 20.0 |
| Bare roots | air-dried | 2.5 | 1.5 | not measured | | |

Table 1 shows that after about six months, there is little difference in infectivity between the wet and the air-dried mixtures of inoculum (roots) with peat. In both wet and air-dried forms, the peat-inoculum mixture was markedly superior to the bare root inoculum, both in initial infectivity and after storage. Generally stated, a moisture content of from 4 to 80 weight percent in the peat represents the range ordinarily found and it appears that infectivity will be retained in pellets made from peats with moisture contents within this range.

While it is convenient to use a harvested mixture of peat and chopped roots, obtained by the above method, the peat and inoculum can be provided separately. The inoculum can take any conventional form known for VA mycorrhiza. Thus, it can take the form of fragments of infected whole roots, spores, sporocarps, hyphae or mycelium.

The VA mycorrhizal fungi which can be used include any of those described in the aforesaid patent specification. Two species which have been found to be particularly beneficial are *Glomus fasciculatus* and *Glomus mosseae*.

The surprisingly high infectivity on storage has been obtained using sphagnum moss peat. The pH of the peat must, of course, be pre-adjusted to a value which is compatible with the desired fungal growth. The VA mycorrhizal fungi are quite pH-sensitive and care must be taken to find the best pH for the particular species and strain of VA mycorrhizal fungus to be associated with the peat. The term 'peat' used throughout the specification includes pH-adjusted peat and it will be understood to include additives required for the pH adjustment or to supply nutrients for the growth of peat in blocks from which a peat-root mixture is harvested. By way of example, the "Shamrock" sphagnum moss peat sold by Bord na mona (Irish Peat Development Authority) Dublin 2, Eire, typically has a pH of from 3.7 to 4.2, which is raised normally to within the range 5.5 to 7 (measured as a 10% by weight slurry in water) according to the VA mycorrhiza used, by addition of lime. For the growing of lettuce, a slow-release phosphate, provided by bone-meal, is often beneficial and the as-harvested peat therefore contains lime and bone-meal. The organic matter present in "Shamrock" peat consists of hemicellulose 36%, cellulose 22%, lignin and cutin 9.2%, bitumens 2%, humic acids 2% and other materials 29%, by weight.

The proportion of peat to roots which may be included can be varied widely, the only requirement being that there should be sufficient peat present to provide a 'host' on which the fungus can survive. The proportions for this purpose, will naturally depend upon the concentration of effective propagules of the fungus contained in the inoculum. For lettuce roots grown by the nutrient film technique described above, the approximate volume proportion of root to peat is 15–20% root to 85–80% peat. The block of roots in peat can be milled to almost any convenient size. Infectivity has been produced using mixtures milled to various sizes between 25 and 800 microns. Larger sized pieces could be used if desired. Surprisingly, the peat-inoculum is still infective even when entirely free of chopped root material and sieved to a size well below that of the resting spores. This indicates that the hyphae impart infectivity.

The third component of the composition is the seed. Each pellet or other 'sowing unit' can contain one or several seeds, depending on what is most advantageous for the particular kind of plant being sown, and the conditions under which the plant is to be grown. Naturally, a small pellet containing several large seeds, for example of maize, wheat or barley, might not retain the same degree of compactness as a pellet containing a small seed, such as clover.

The binder component of the composition serves to make the pellet reasonably coherent, i.e. not too crumbly. While a great variety of binders would achieve this purpose, it is also necessary to ensure that the radicle emerging from the seed can grow satisfactorily through the pellet and the binder should therefore impart a reasonably soft consistency to the pellet. For this reason, 'hard' binders, for example plaster of Paris or gypsum should be avoided. One very satisfactory binder is wood pulp, that is to say the fibrous raw material used in paper-making. Another satisfactory binder is methyl cellulose, normally in a mixture with wood pulp. "Laponite" (a magnesium silicate gel) is another. With the same considerations in mind, the proportions of binder and peat-inoculum mixture in the pellet must be adjusted carefully. Thus, using a wood pulp binder, it was found that the proportion of air-dried peat should not exceed about 1.5 parts per part by weight of wood pulp, because the pellet became too crumbly. While the pellet can contain quite large proportions of binder, e.g. as much as 90% by weight, the amount of infectivity available from such a pellet is correspondingly small. In general, the aim should be to minimise the proportion of binder present, while maximising the proportion of peat-inoculum mixture and the infectivity of the inoculum within that mixture. For wood pulp-peat-inoculum mixtures, the preferred proportions are from 1 to 3 parts of wood pulp per part by weight of peat-inoculum mixture (air-dried basis).

The composition can be prepared by mixing the ingredients in any desired order. To provide 'sowing units', each unit containing preferably from 1 to 3 seeds, the mixture is compacted into a suitable form. Preferably the mixture, in a wet condition, is pelleted. Any conventional pelleting machinery can be used. For example, a rod of material can be extruded continuously at a constant speed and a blade set to cut the rod transversely at timed intervals, to form pellets. Alternatively, the composition could be moulded into small cubes or other desired shapes.

The pellets can contain other ingredients including fungicides, pesticides, trace elements or plant growth assistants. A particularly preferred ingredient for appropriate plants is *Rhizobium* inoculum.

The pellets are extremely light and in order to increase their weight slightly, where they are to be dropped on ground exposed to strong winds, for example, an inert material such as sand may be included. The proportion of sand can be any from zero to (say) 80 or 90 weight percent.

Using the method of the invention, it is possible to sow fields on a large scale and in a particularly convenient way. It is expected that this method of sowing will be particularly useful in producing crops on poor soil, e.g. poor pasture land, reclaimed gravel pits, coal mine spoil tips and slag heaps, of low phosphorus content. If desired, the sowing of a pellet in accordance with this invention can be combined with the use of a paper sheet or other carrier material impregnated with inoculum and placed so that roots from the seedling will grow in contact with it.

The following Examples illustrate the invention. The pH measurements refer to a 10% by weight slurry in water.

EXAMPLE 1

Production of Peat-inoculum

56 Kg of medium cut sphagnum moss peat (Irish moss peat from Bord na Mona, i.e. the Irish Peat Development Authority, Dublin 2, Eire, sold under the name 'Shamrock') together with 400 grams of bone-meal and 1 Kg of VA mycorrhizal inoculum, consisting of infected maize roots spores and mycelium in sand and grit were mixed thoroughly with 150 liters of water. Agricultural lime (calcium carbonate) was added at the rate of 800 grams for *Glomus fasciculatus* pH 5.6 or 1.6 Kg for *Glomus mosseae* (ph 6.5). The peat mixture was mechanically compressed into 4 cm.$^3$ blocks, this quantity yielding approximately 2,200 such blocks.

The following schedule is flexible, depending on seasonal factors, since lettuce growth is faster in summer than in winter. A single lettuce split pill, *Lactuca sativa* variety Ostinata (summer) or variety Dandie (winter), was sown on each peat-inoculum block. Blocks were kept in propagating house at a temperature of 24° C. during the day and 20° C. during the night in summer and 12° C. during the day and 10° C. during the night in winter. Supplementary illumination by sodium lights was provided in winter. After 3 to 4 weeks during the summer and 6 to 7 weeks during winter, a sample of 20 plants was taken, the roots washed free from peat, soaked in 10% KOH for 12 hours at 65° C., washed three times with water, acidified with 2% HCl, stained by soaking in 0.05% lactophenol trypan blue for 5–10 minutes and stored in lactic acid. VA mycorrhizal infection was assessed using the gridline intersect method of Giovanetti and Mosse, supra. Infection levels of 22 to 30% were generally recorded. The plants were transferred to the glasshouse, having a floor of parallel 10 cm. wide concrete channels, inclined at a slope of 1:70 vertical:horizontal, along which a nutrient solution was flowed. The rate of flow was 200 ml. per minute. The nutrient solution was collected in a catchment tank at the base of the channels and recirculated. The peat blocks were placed in a continuous line along each channel. The nutrients listed in Table 2 below were added and, with the exception of rock phosphate, replenished weekly for the first 3 weeks (summer) or 5 weeks (winter) and then every 4 to 5 days thereafter.

TABLE 2

| Nutrient solution formulation | |
|---|---|
| Rock phosphate | 65.6 mg./liter |
| Fe EDTA | 35.0 mg./liter |
| MgSO$_4$.7H$_2$O | 43.7 mg./liter |
| KNO$_3$ | 28.0 mg./liter |
| CaSO$_4$.2H$_2$O | 83.3 mg./liter |
| Trace Element Solution | 0.8 ml./liter |
| Trace Element Solution | g./liter |
| ZnSO$_4$.7H$_2$O | 0.22 |
| CuSO$_4$.5H$_2$O | 0.08 |
| Na$_2$MoO$_4$2H$_2$O | 0.27 |
| CoSO$_4$.6H$_2$O | 0.05 |
| H$_3$BO$_3$ | 2.86 |
| MnCl$_2$.4H$_2$O | 0.18 |

The pH of the circulating solution was maintained at 5.6 for *Glomus fasciculatus* or pH 6.5 for *Glomus mosseae*, using 1M sulphuric acid. After 8–10 weeks (summer) or 12–14 weeks (winter), infection has spread throughout the root system, giving 60 to 80% infection. There was an extensive network of external mycelium ramified throughout the peat. Many spores or sporcarps were 'external', i.e. observed in the peat, not merely on the roots. The circulating solution was switched off and the blocks allowed to air-dry to 5% moisture (approximately) before collection. Each block weighed approximately 110 grams when wet and 15 grams when air-dried.

Determination of Infectivity of Peat-inoculum

The infectivity of a typical peat-lettuce root inoculum obtained by nutrient film technique (NFT) culture of lettuces in peat blocks has been determined by the dilution series method of C Ll Powell, Soil Biol. Biochem. 12, 247–250 (1980). Two- and ten-fold dilution series were prepared (to $2^{-8}$ and $10^{-4}$ respectively) by mixing the peat-inoculum with sterilised peat and used as a growth medium for clover seedlings. Five replicate vials of each dilution were used. After 30 days the clover seedlings were removed and mycorrhizal infection of the root system scored as present or absent. The most probable number of infective propagules in the inoculum is related to the frequency of infected plants at successive dilutions and was determined by computer using the Maximum Likelihood Program devised by the Statistics Department of Rothamsted Experimental Station, Harpenden, Herts AL5 2JQ. The mycorrhizal fungus used in the determination was *Glomus mosseae* YV strain. Three assays were carried out as follows on: (a) peat-inoculum allowed to dry in air in channels in which the lettuces were grown, before being harvested;

the block of inoculum was then broken up, the roots and peat clinging to them being broken into pieces of average size roughly less than 1 cm; (b) peat-inoculum milled to a size of 800 microns and (c) oven-dried peat-inoculum, being type (a) oven-dried at a temperature of 65° C. The results were as follows:

| | Number of propagules per gram | Standard error |
|---|---|---|
| (a) Air-dried peat inoculum | 18.1 | 0.12 |
| (b) Milled peat inoculum | 9.8 | 0.11 |
| (c) Oven-dried peat inoculum | 8.6 | 0.12 |

Preparation of Pellets

The air-dried blocks described above were crumbled by hand or milled, using a hammer mill to a particle size of less than 5 mm. The wood pulp used as binder is that supplied as the normal raw material for paper-making. (The ultimate raw material is chips of eucalyptus wood, which are cooked under pressure and bleached. The pulp is then sheeted.) The sheeted wood pulp was reconstituted in water using a liquidiser at high speed for 4 minutes. The peat-inoculum mixture was then added and blended for a further 2 minutes in the liquidiser. Excess water was removed using a sieve, and clover seed was added at a concentration of 0.5 grams seed per 40 grams of mixture of other components. This gave approximately 8 plus or minus 3 seeds per pellet. The mixture was compressed into pellets using, on a laboratory scale, a modified syringe. The pellets were dried at 30° C. for 1 hour, before storage. The pellet size was 1.2 cm. in diameter × 0.8 plus or minus 0.2 cm. high. (There were some variation in the height, in view of the relatively crude equipment used for the purpose of making the pellets on a laboratory scale.) Nine experiments were carried out, using the following proportions of peat-inoculum mixture to wood pulp (by weight) 5:1, 4:1, 3:1 and 2:1, all of which gave pellets which were too crumbly; 1:1, 1:2 and 1:3, which gave pellets of satisfactory consistency; and 1:4 and 1:5, which gave pellets which were too hard because of the high proportion of binder.

In another experiment, methyl cellulose was added at a rate of 1 gram per 20 grams of the peat-inoculum/pulp mixture, i.e. in a proportion of 5% by weight. It was added to the dry peat and thoroughly mixed before the peat was added to the pulp. This was found to produce a satisfactory pellet using the peat-inoculum mixture: wood pulp weight ratio of 1:1. Methyl cellulose, on its own, in place of all the wood pulp, gives too sticky a composition for ordinary purposes.

Comparison of Infectivity of Pellets versus Loose Peat-inoculum

In this trial, the infectivity of the pellets described above, made with the 1:1 mixture of peat-inoculum/-wood pulp was compared to that of loose inoculum placed below the seed. Plastic vials (5×3.5 cm.) were filled with a 0.5 cm. layer of sterile grit at the bottom, followed by a 2 cm. layer of sterile sand, followed by (a) a clover-seeded pellet as described above, or (b) the same weight of peat-inoculum, a mixture in loose form, with clover seed placed on top. The same number of seeds was used in each vial. A band of sand was then placed on top of the clover seed in (b) and in (a) sand was added around the pellet, to bring the depth of material in the vial to the same leve. The vials were kept in a glasshouse. There were 5 replicate vials of each treatment, i.e. (a) and (b), and harvesting took place after 30 days. The clover roots were washed free from sand etc, stained and assessed for infection as described above. The degree of infection was substantially the same, i.e. 31.2% for (a) and 33.4% for (b), which is well within the limits of experimental error.

These results show that the pelleting of inoculum with seed and binder gives as good an effect as is obtained by sowing seed on top of inoculum, which is a far more labour-intensive operation and one which is not practical to carry out on a large scale in fields. The method of the invention is therefore expected to be highly advantageous for this purpose and to make a substantial contribution to environmental improvement.

EXAMPLE 2

Preparation of Pellets

Cylindrical pellets of diameter 10.1 mm and length 16.8 mm were made from a mixture of sharp sand, peat-inoculum prepared by the above described NFT culture white clover seed, "Laponite" binder and an inoculum of *Rhizobium trifolii* (in yeast mannitol broth). The proportions of these ingredients are shown in Table 3 below.

TABLE 3

| Composition of multi-seeded pellets | |
|---|---|
| Ingredient | Per kg pellets (wet weight) |
| Sand | 540 g |
| Peat/mycorrhizal inoculum (weight) | 245 g |
| "Laponite 550" | 73 g |
| White clover seed (S184) (equivalent to about 10 seeds per pellet) | 3.27 g |
| Rhizobium inoculum (yeast mannitol broth) | 150 ml |

The wet peat-inoculum had a moisture content of about 70% by weight. Sand was included in the mixture to increase the pellet weight (dry peat-only pellets blow about in strong winds) and to increase the drying speed. "Laponite" was used as a binder. Later experiments have established that this component can be reduced to 4 g/kg pellets without any significant changes in pellet properties. S184 is a variety of white clover recommended for use on hill-farming land. The seed levels were adjusted to produce pellets with 10 seeds. The strain of *Rhizobium trifolii* used was SPEC from the Welsh Plant Breeding Station. This has been found to be effective on upland peaty soils in Wales and is marked by high levels of tolerance to the antibiotics spectromycin and rifampicin which makes it readily identifiable.

The ingredients except for the *Rhizobium* inoculum were mixed in a bucket. *Rhizobium* broth culture was added until the material stuck together as a solid mass. A sausage of the composition was extruded through a modified nylon funnel or through a modified sausage-making attachment on a food mixer. The sausage was chopped into pellets. The pellets were air-dried with the aid of a fan heater. Pellets dried in 2-3 hours and had a moisture content after drying of 4-6% by weight. If drying takes more than 3 hours, the seeds imbibe moisture and are subsequently killed on drying out.

Storage of Pellets

The effect of storage time on survival of the rhizobia and mycorrhizal fungi in pellets is shown in Table 4.

Storage was in polythene bags at room temperature (22° C.).

TABLE 4

Storage time and the survival of rhizobia and mycorrhizal fungi in multi-seeded pellets

| Storage time (months) | Rhizobia/pellet | Mycorrhizal fungi |
| --- | --- | --- |
| 0 | $10^7$ | + |
| 1 | $10^6$ | + |
| 3 | $10^4$ | + |
| 6 | $10^3$ | + |

"+" indicates mycorrizhal infection of clover roots.

Although rhizobial numbers declined, there were sufficient remaining after six months to provide an effective inoculum. Mycorrhizal fungi were also able to survive for six months in the pellets.

Response to liming and phosphate application

Pellets were distributed on peat turves from Caithness, Scotland. In 3 experiments, lime (ground chalk) and/or phosphate (superphosphate) were added at recommended rates (5.5 tonnes/ha and 90 kg/ha respectively). In a control experiment no lime or phosphate was added. Clover plants were harvested after five months grown in field conditions in England. The results are shown in Table 5.

TABLE 5

Influence of lime and phosphate on growth of clover from pellets

| Treatment Lime | Phosphate | Plants/ Pellet | Clover fresh wt./ (g) | Nodules/ pellets |
| --- | --- | --- | --- | --- |
| Yes | Yes | 7.0 | 7.9 | 8.8 |
| No | Yes | 7.6 | 4.4 | 10.5 |
| Yes | No | 7.2 | 1.4 | 3.8 |
| No | No | 5.4 | 0.8 | 3.3 |

Clover was able to grow and form rhizobial nodules in the absence of lime and phosphate due to the favourable micro-climate provided by the pellet. However no rhizobial nodules were found away from the immediate vicinity of the pellet. There was a considerable response in clover growth to addition of lime and particularly of phosphate to the turves. Mycorrhiza were found in all conditions but there was still an enormous response to phosphate.

I claim:

1. A composition comprising a mixture of vesicular-arbuscular mycorrhizal fungal inoculum, peat adjusted to a pH compatible with growth of the fungus from the inoculum, at least one seed of a plant which is a host for the fungus, and a binder, said composition being in compacted form, and divided into units suitable for sowing.

2. A composition according to claim 1, wherein the inoculum and peat have been obtained by harvesting blocks of roots of a plant grown in peat and infected with the fungus, and finely dividing these blocks.

3. A composition according to claim 1, wherein the binder comprises wood pulp.

4. A composition according to claim 3 wherein the proportion of peat to wood pulp is not greater than 1.5 parts of air-dried peat per part by weight of wood pulp.

5. A composition according to claim 1, wherein the inoculum is of *Glomus mosseae* or *Glomus fasciculatus* and the pH of the peat is about 6.5 or 5.6 respectively, measured as a 10% by weight slurry of the peat in water.

6. A composition according to claim 1, wherein the peat is sphagnum moss peat.

7. A composition according to claim 6 in the form of pellets.

8. A composition according to claim 1 in the form of pellets.

9. A composition according to claim 8 containing from 1 to 3 seeds per pellet.

10. A method of growing a plant from seed, which comprises sowing units of a composition according to claim 1, in a plant growth medium in which the plants can grow under conditions in which they benefit from VA mycorrhizal fungal infection of their root system.

* * * * *